April 28, 1970     W. M. MACEK     3,508,831

RING LASER HAVING MINIMIZED FREQUENCY LOCKING CHARACTERISTIC

Filed July 7, 1966     2 Sheets-Sheet 1

NORMAL BEAT SIGNAL

*a*

DISTORTED BEAT SIGNAL
DUE TO PULLING

*b*

INVENTOR.
WARREN M. MACEK
BY
*Robert J. Haase*
ATTORNEY

United States Patent Office 3,508,831
Patented Apr. 28, 1970

3,508,831
RING LASER HAVING MINIMIZED FREQUENCY LOCKING CHARACTERISTIC
Warren M. Macek, Huntington Station, N.Y., assignor to Sperry Rand Corporation, Great Neck, N.Y., a corporation of Delaware
Filed July 7, 1966, Ser. No. 563,428
Int. Cl. G01b 9/02, 11/26
U.S. Cl. 356—106                                3 Claims

ABSTRACT OF THE DISCLOSURE

A ring laser device including a composite structure forming a corner of the laser cavity and comprising a light beam velocity controlling medium located between a pair of prisms along the propagational axis of the contradirectional light beams oscillating in the laser cavity, the light beams being redirected by refraction through the prisms and so polarized while traversing the beam velocity controlling medium as to be differentially affected thereby.

---

The present invention generally relates to ring lasers, and more particularly, to such a laser wherein provision is made for the insertion of beam velocity control means such as frequency biasing means in the resonant cavity without aggravating the frequency locking characteristic or bias threshold existing in the laser prior to the introduction of the control means.

As is well understood, each oscillatory mode of a so-called "ring" or closed loop resonant cavity laser comprises two beams of light which travel around the cavity in opposite directions. Ordinarily and unless perturbed, the counter-rotating beams form a degenerate set, each beam having exactly the same frequency. The degeneracy can be removed in a variety of ways, for example, by rotation of the ring-shaped cavity about an axis normal to the plane of the cavity or by the use of a birefringent material positioned within the cavity. Ring lasers most often are employed to sense angular rotation rates about an axis normal to the plane of the cavity. Rotation rate is determined by measuring the frequency difference between the counterrotating beams, which frequency difference arises from the removal of degeneracy by angular rotation. The frequency difference is easily ascertained by extracting the counterrotating beams from the cavity, heterodyning the extracted beams in a photodetector to produce a "beat" frequency signal and then measuring the frequency of the beat signal.

Early in the development of the ring laser, it was discovered that no beat signal was detectable between the clockwise and the counterclockwise rotating beams when the angular rotation of the ring laser was less than a certain finite threshold value. In more detail, the following effects have been noted:

(1) When the ring laser angular rotation increases to values well above the aforesaid threshold value, a linear relationship exists between the ring laser rotation rate and the frequency of the beat signal.

(2) When the ring laser angular rotation reduces towards the threshold value and the frequency of the beat signal approaches the corresponding "threshold" frequency considerable distortion takes place in the beat signal waveform and the relation between the ring laser rotation rate and the frequency of the beat signal becomes non-linear.

(3) The beat signal threshold frequency increases in value if the coupling between the counterroatting beams is increased, as for example, by the insertion of an optical component within the ring cavity which reflects or refracts the beams back along the optical path.

Each of the counterrotating beams draws its energy from a respective atomic source in the active laser medium. A reflecting or scattering component placed in the optical path reverses the direction of the beams incident thereon and causes each beam to traverse the ring cavity in both directions whereby each beam draws energy from (and therefore couples) the two atomic sources. In the presence of non-linearities within the laser medium, the two coupled atomic sources become synchronized to each other. The synchronization of the sources causes the disappearance of the beat signal at a threshold frequency which increases as the coupling between the two sources increases.

Frequency synchronization in the case of the ring laser destroys its ability to sense low angular rotations below which the beat frequency vanishes. This problem can be avoided, however, by introducing birefringent means into the ring cavity optical path which frequency biases the counterrotating beams so that a frequency difference (beat signal) exists above threshold frequency at all times. It is only necessary that the frequency bias be great enough to guarantee that the ring laser never operates in the frequency locking region of its characteristic for all contemplated values of angular rotations.

Frequency off-setting or biasing can be achieved by the insertion of birefringent means within the optical path of the ring laser as disclosed in patent application S.N. 328,326, filed Dec. 5, 1963, now U.S. Patent No. 3,382,758 issued in the name of Chao C. Wang for "Rotation Rate and Rotation Direction Sensing Ring Laser" and assigned to the present assignee. Unless specific provision is made, however, the insertion of birefringent means increases the mode coupling between the counterrotating beams of the ring laser, increases the threshold frequency, and results in increased losses, reduced stability and reduced dynamic range of the ring laser.

One object of the present invention is to provide a ring laser having a frequency locking characteristic substantially unaffected by the insertion of optical biasing means in the laser resonant cavity.

Another object is to provide a frequency biased ring laser of improved stability.

A further object is to provide a frequency biased ring laser having enhanced dynamic range.

These and other objects of the present invention, as will appear from a reading of the following specification, are accomplished in a typical frequency biased ring laser embodiment by the provision of a composite structure comprising a birefringent means sandwiched between a pair of prisms. Each prism is cut so that the respective counterrotating beam impinges at Brewster's angle and is refracted into the direction of the birefringent means. The birefringent means introduces a delay into one of the counterrotating beams which is different from the delay introduced into the other counterrotating beam. The composite structure is located at one of the vertices of the (triangular) "ring" resonant cavity whereby the composite structure not only serves to introduce the birefringence necessary for the amount of frequency biasing desired but also replaces the mirror which ordinarily would be used at said corner. The Brewster angle cuts of the prisms prevent increased coupling between the counterrotating beams (relative to the pre-existing coupling prior to the addition of the composite structure to the resonant cavity), thus avoiding increased frequency locking of the ring laser and preserving the inherent dynamic range and stability of the ring laser.

For a more complete understanding of the present invention reference should be had to the following specification and to the drawings of which:

Figure 1:
FIGURE 1 is a pair of waveforms depicting beat signal distortion due to the frequency locking effect in a ring laser.
Figure 1:

The waveform of FIGURE 1(a) exemplifies the undistorted sinusoidal shape of the beat signal of the counterrotating beams of a ring laser for angular rotation rates well above the threshold value. When the angular rotation of the ring laser is reduced towards the aforesaid threshold value and the frequency of the beat signal approaches the threshold frequency, considerable distortion is observed in the beat signal waveform as shown in FIGURE 1(b). The distortion, of course, makes the measurement of laser rotation rate uncertain and difficult. Not only does the distorted waveform contain components masking the fundamental component whose frequency represents laser rotation rate but the frequency of the fundamental component fluctuates rapidly and randomly as the oscillatory modes of the laser plunge toward frequency locking condition and then veer temporarily toward a more stable condition. It can be seen, therefore, that it is necessary to operate the ring laser at angular rotation rates well above the threshold value in order that the beat frequency waveform remain free as shown in FIGURE 1(a) from instability and distortion throughout the full range of contemplated angular rotations.

Figure 2:
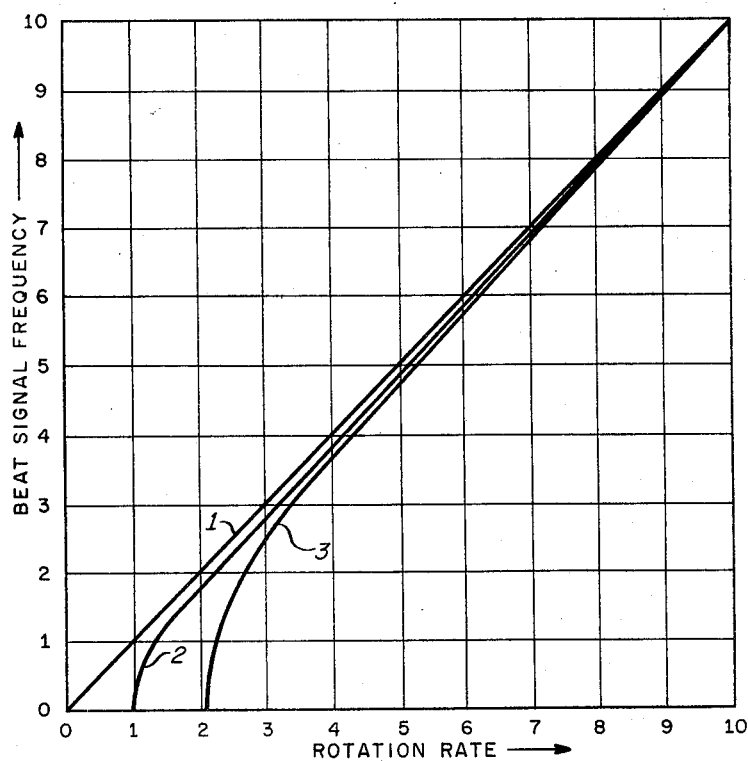
FIGURE 2 is a series of plots representing the variation of beat signal with rotation rate as a function of frequency locking effect.

The frequency locking effect produces other undesirable results as shown in the plots of FIGURE 2. The straight line of FIGURE 2 represents an ideal linear relation between ring laser rotation rate and the frequency of the beat signal. The ideal relationship, however, cannot be achieved in practice. In any physically realizable ring laser, reflecting discontinuities exist which cause each of the counterrotating beams to be reflected (either specularly or diffusely) back in the opposite direction along its path of travel. Thus, the nominally clockwise rotating beam is partially reflected to travel also in a counterclockwise direction around the ring laser resonant cavity. Likewise, the nominally counterclockwise rotating beam is partially reflected to travel in a clockwise direction. The simultaneous propagation of each beam in both directions around the laser cavity results in the intercoupling of the atomic sources which produce the nominally clockwise and the nominally counterclockwise rotating beams, respectively.

In the presence of non-linearities, as for example, in the active laser material, the intercoupling of the two atomic sources creates a frequency locking characteristic whereby the beat signal does not exist for angular rotations below a minimum value termed "threshold frequency." The value of the threshold frequency in a given ring laser depends upon the magnitude of the intercoupling of the two atomic sources and, consequently, upon the magnitude of the reflecting discontinuities encountered by the counterrotating beams. Discontinuities giving rise to reflection are present in the ring laser resonant cavity by virtue of the active laser material itself (such as ionized gas particles) and each of the mirrors at the corners of the cavity.

Curve 2 of FIGURE 2 shows the relationship between laser rotation rate and beat signal frequency in a practical ring laser. It will be noted that a substantially linear relationship obtains between the aforesaid two parameters for large values of rotation rate whereas the relationship degenerates and becomes increasingly non-linear for lesser value of rotation rates until, finally, the beat signal disappears entirely at a finite value of rotation rate.

The frequency locking effect depicted by curve 2 of FIGURE 2 destroys the ability of a ring laser to measure low rotation rates below the threshold value. A given ring laser, however, can be adapted for the measurement of such rotation rates by the expedient of introducing birefringment means within the resonant cavity which produces a quiescent frequency difference between the counterrotating beams (hence a finite beat signal) even in the absence of any rotation as disclosed in the aforementioned Patent 3,382,758. The insertion of a physical component in the resonant cavity in order to introduce the necessary birefringence normally would be expected to increase the total reflecting discontinuities in the ring laser giving rise to increased frequency locking characteristics as represented by curve 3 of FIGURE 2. The dynamic range, i.e., the range of laser rotation rates throughout which a substantially linear relationship obtains between beat signal frequency and laser rotation rate, is reduced by the insertion of birefringent means (curve 3) relative to the dynamic range of operation existing prior thereto (curve 2). The present invention is directed at the introduction of birefringent means for frequency biasing a ring laser without objectionably increasing the frequency locking effect previously obtained in the ring laser.

Figure 3:
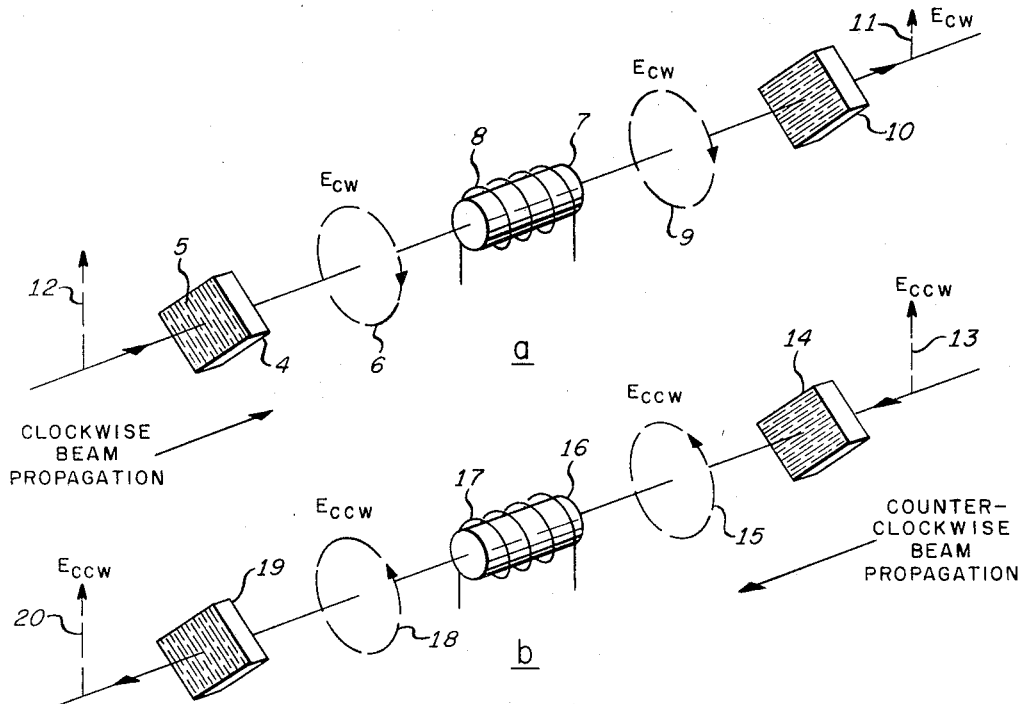
FIGURE 3 are simplified schematic drawings illustrating the principles of frequency biasing in a ring laser.

FIGURE 3 depicts simplified schematic diagrams, setting forth the components of a typical frequency biasing means which may be inserted in the resonant cavity of a ring laser to provide a quiescent beat signal frequency in the absence of any ring rotation. FIGURE 3(a) depicts the action of the frequency biasing means on the beam which propagates in the clockwise direction around the ring laser whereas FIGURE 3(b) represents the action of identically the same frequency biasing means on the beam which propagates in the counterclockwise direction. The same components are given different reference numerals (such as 4 and 19) in FIGURES 3(a) and 3(b) solely to facilitate the explanation of operation. It is assumed in both FIGURES 3(a) and 3(b) that the clockwise and counterclockwise propagating beams are linearly polarized. The linearly polarized clockwise propagating beam is represented in FIGURE 3(a) by the arrow 12 which impinges upon quarter waveplate 4 in a direction 45° relative to the fast axis of the plate represented by the parallel lines 5. Plate 4 converts the incident linearly polarized light in to a left-handed circularly polarized beam represented by the arrow 6, i.e., a beam which is seen to rotate in a counterclockwise direction when viewed by an observer receiving the light. The circularly polarized light impinges upon Faraday rotator cell 7 which is magnetically biased by means of winding 8 to exhibit birefringence to circularly polarized light passing through the cell in opposite directions of propagation. The phase delayed circularly polarized light issuing from cell 8 (represented by the arrow 9) impinges upon quarter wave plate 10 whose fast axis is inclined 90° with respect to the fast axis of plate 4. Plate 10 converts the circularly polarized light represented by arrow 9 into linearly polarized light represented by the arrow 11 oriented in the same direction as the input linearly polarized light represented by the arrow 12.

FIGURE 3(b) represents the same apparatus depicted in FIGURE 3(a) but acting upon the counterclockwise propagating beam of the ring laser. In this case, the linearly polarized incident light represented by arrow 13 is converted by quarter waveplate 14 into circularly polarized light represented by the arrow 15. It should be noted that the arrow 15 represents left-handed circularly polarized light in the same manner as arrows 6 and 9 of FIGURE 3(a). In all cases, the light appears to rotate in a counterclockwise direction from the position of an observer who is receiving the light. The difference in operation is attributable to the fact that the light passes through Faraday cell 7 from left to right in the view of FIGURE 3(a) but passes through Faraday cell 16 from right to left in the view of FIGURE 3(b). Cell 16 is magnetically biased by coil 17 to exhibit birefringence to circularly polarized light whereby the phase delay suffered by the counterclockwise propagating beam is different from the phase delay suffered by the clockwise propagating beam. The phase delayed circularly polarized beam is represented by the arrow 18 and is converted by quarter waveplate 19 into linearly polarized light represented by the arrow 20.

The insertion of a structure such as shown in FIGURE 3 into a pre-existing ring laser resonant cavity ordinarily introduces additional discontinuities at which specular or diffuse reflection of the counterrotating beams can occur. Anti-reflection coatings can be resorted to but they do not by themselves reduce the discontinuities encountered by the counterrotating beams to an acceptable amount. In accordance with the present invention, the frequency biasing means is integrally combined in one composite structure with one of the corner devices of the ring laser whereby the frequency biasing means introduces substantially no reflecting discontinuities not already presented by the corner device. The composite structure and the ring laser wherein it is used are represented in FIGURE 4.

Figure 4:
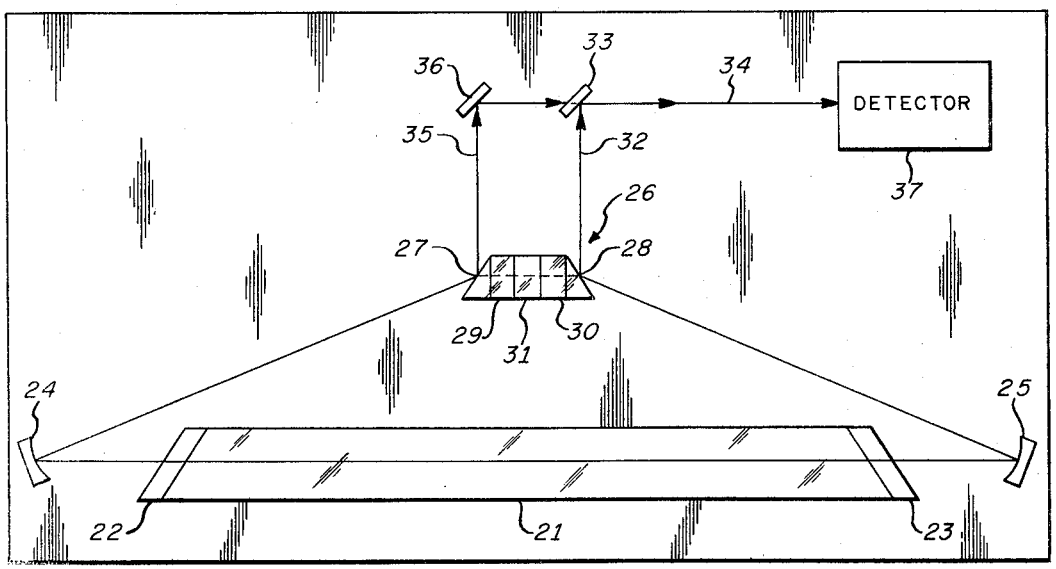
FIGURE 4 is a simplified schematic diagram of a ring laser embodying the frequency biasing means of the present invention.

The ring laser of FIGURE 4 comprises gas laser tube 21 having Brewster angle end windows 22 and 23 through which issue linearly polarized beams of light whose polarization is in the plane of the figure. Each of the beams is directed in a respective direction around the ring by corner mirrors 24 and 25 and corner composite structure 26. Composite structure 26 comprises Brewster angle prisms 27 and 28, quarter waveplates 29 and 30, and Faraday cell 31 which are fixed together by index-matched adhesive. Elements 29, 30 and 31 correspond to elements 4, 7 and 10 of FIGURE 3(a) and elements 19, 16, and 14 of FIGURE 3(b). The counterclockwise rotating beam impinges upon prism 28 at Brewster's angle and is refracted into a direction normal to quarter waveplate 30. Plate 30 converts the incident linearly polarized counterclockwise rotating beam into circularly polarized light which is delayed by magnetically biased Faraday cell 31 and then converted by quarter waveplate 29 into linearly polarized light which is refracted upon exiting from prism 27. Similarly, the clockwise propagating beam impinges upon prism 27 and is refracted into a direction normal to quarter waveplate 29. Plate 29 converts the incident linearly polarized clockwise rotating beam into circularly polarized light which is delayed by Faraday cell 31 (by an amount different from the delay experienced by the counterclockwise propagating beam), is then converted to linearly polarized light by quarter waveplate 30, and is refracted upon exiting from prism 28.

It should be observed that the counterrotating beams are redirected by composite structure 26 by refraction rather than by reflection as in the case of mirrors 24 and 25. Substantially 100% transmission is achieved at prisms 27 and 28 due to the Brewster's angle incidence of the linearly polarized beams; substantially no reflection takes place at the prism-air interface. Substantially no reflection occurs at the quarter waveplate prism interfaces or at the Faraday cell-quarter waveplate interface because of the matching of the respective indexes of refraction. In short, reflecting discontinuities are held to a minimum within composite structure 26; in any case, the reflecting discontinuities already attributable to the presence of prisms 27 and 28 are not substantially increased by the additional presence of quarter waveplates 29 and 30 and Faraday cell 31 between prisms 27 and 28. The indices of refraction of the prisms, quarter waveplates and the Faraday cell are substantially the same.

A feature of the embodiment shown in FIGURE 4 is the optional manner in which the counterrotating laser beams are extracted from the resonant cavity in order to generate the beat signal whose frequency represents the rotation rate of the ring laser about an axis passing through the plane of the ring (plane of the drawing). Simply by rotating the composite structure 26 so that the linearly polarized counterrotating beams impinge upon prisms 27 and 28 slightly out of the plane of incidence of the prism-air interfaces, a small amount of specular reflection takes place at each of the prism-air interfaces, the counterclockwise propagating beam being reflected at prism 28 and the clockwise propagating beam being reflected at prism 27. The partially reflected counterclockwise propagating beam 32 is redirected by beam splitter 33 along path 34. The partially reflected clockwise propagating beam 35 is redirected by mirror 36 and beam splitter 33 along the same path 34. The collinear beams along path 34 are applied to a detector 37 such as a photomultiplier cell which produces a beat signal in a conventional manner whose frequency equals the frequency difference between the counterrotating beams of the ring laser, and hence, represents the angular rotation of the ring laser. Alternatively, the beams may be extracted in a conventional manner by making one of mirrors 24 and 25 partially transmitting and then making collinear the beams transmitted therethrough.

It will be recognized that although frequency biasing means (29, 30 and 31) are utilized in the disclosed embodiment, the present invention is adapted for the substitution of other beam velocity control means such as frequency modulating means in lieu of the frequency biasing means. For example, an electrooptic material whose index of refraction is controllable may be sandwiched between prisms 27 and 28 for varying the effective closed loop optical path length and, hence, the frequency of both of the counterrotating beams. Irrespective of the nature of the beam velocity control means employed, the present invention provides the same benefits of inserting the control means in the laser resonant cavity with substantially no adverse effect on the frequency locking characteristic thereof.

What is claimed is:
1. A ring laser comprising
  means for forming a closed loop optical cavity containing an active lasing medium for generating contradirectionally propagating light beams therein, at least one of said cavity forming means being a composite structure including
  a pair of prisms, and
  beam velocity controlling means positioned between said prisms,
  said beam velocity controlling means having a propagational axis along which the velocity of said beams can be controlled,
  each of said prisms refracting a respective incident beam and redirecting said respective beam along said axis, and said contradirectional light beams being polarized while propagating through said beam velocity controlling means so as to be differentially delayed thereby.

2. A composite structure as defined in claim 1 wherein said beam velocity controlling means is a birefringement means.

3. A ring laser as defined in claim 1 wherein said beam velocity controlling means and said prisms have substantially matched indices of refraction, and each of said contradirectional beams impinges upon a respective prism at substantially Brewster's angle.

References Cited

UNITED STATES PATENTS

| | | | |
|---|---|---|---|
| 3,277,393 | 10/1966 | Nicolai | 331—94.5 |
| 3,388,314 | 6/1968 | Gould | 321—69 |

RONALD L. WIBERT, Primary Examiner

T. R. MOHR, Assistant Examiner

U.S. Cl. X.R.

356—138